United States Patent
Kühn

(10) Patent No.: US 8,747,061 B2
(45) Date of Patent: Jun. 10, 2014

(54) STEAM TURBINE

(75) Inventor: Helmut Kühn, Mengelsdorf (DE)

(73) Assignee: Siemens Aktiengesellschaft, München (DE)

( * ) Notice: Subject to any disclaimer, the term of this patent is extended or adjusted under 35 U.S.C. 154(b) by 883 days.

(21) Appl. No.: 12/559,803

(22) Filed: Sep. 15, 2009

(65) Prior Publication Data

US 2010/0074737 A1 Mar. 25, 2010

(30) Foreign Application Priority Data

Sep. 25, 2008 (EP) .................................. 08016914

(51) Int. Cl.
*F01D 5/08* (2006.01)

(52) U.S. Cl.
USPC .......................................... 415/180; 415/115

(58) Field of Classification Search
USPC ............... 415/180, 115, 216.1, 229, 110–112
See application file for complete search history.

(56) References Cited

U.S. PATENT DOCUMENTS

| 5,104,284 | A | 4/1992 | Hustak, Jr. et al. |
| 6,224,327 | B1 * | 5/2001 | Aoki et al. ..................... 415/115 |
| 7,112,036 | B2 * | 9/2006 | Lubell et al. ................... 415/104 |
| 2004/0118894 | A1 * | 6/2004 | Koch et al. ..................... 226/188 |
| 2007/0273219 | A1 * | 11/2007 | Shimada .......................... 310/52 |

FOREIGN PATENT DOCUMENTS

| DE | 4444587 A1 | 6/1996 | |
| EP | 0287440 A1 | 10/1988 | |
| EP | 1391586 A1 | 2/2004 | |
| JP | 6159362 | 6/1994 | |
| JP | H10-510896 | * 10/1998 | |
| JP | 2004-526884 | * 9/2004 | |
| WO | WO 9618805 A1 * | 6/1996 | ............. F01D 25/16 |

OTHER PUBLICATIONS

Translation of JP 2004-526884.*
Translation of JP H10-10896.*

* cited by examiner

*Primary Examiner* — Edward Look
*Assistant Examiner* — William Grigos

(57) ABSTRACT

A steam turbine with at least one magnetic bearing for the shaft is provided, a metal paneling being attached in the area of a magnetic bearing. The metal paneling consists of metal rings insulated from one another. Further, cooling air ducts are provided in the area of the magnetic bearing.

8 Claims, 5 Drawing Sheets

STEAM TURBINE

CROSS REFERENCE TO RELATED APPLICATIONS

This application claims priority of European Patent Office Application No. 08016914.7 EP filed Sep. 25, 2009, which is incorporated by reference herein in its entirety.

FIELD OF INVENTION

The present invention relates to a steam turbine with at least one magnetic bearing for the shaft, with steel paneling being attached in the area of a magnetic bearing.

SUMMARY OF INVENTION

A magnetic bearing represents an alternate option to the support methods used to date. The outstanding attribute of the magnetic bearing is the lack of contact between supported part and bearing. The bearing forces needed are generated by an appropriate magnetic field which is established between the fixed part and the part to be supported. This means that the magnetic bearing is friction-free and needs no lubricant.

If a magnetic bearing is used to support the shaft of a steam turbine, then the high temperatures occurring during the operation of the steam turbine are a problem for the magnetic bearing.

Metal paneling is attached in the area of the magnetic bearing to minimize the eddy current losses in the bearing. This metal paneling normally consists of a number of metal rings insulated from one another by a suitable coating. The high temperatures in the shaft of a steam turbine can lead to the coating melting and thereby to the metal paneling being destroyed.

An object of the present invention is thus to specify a steam turbine with at least one magnetic bearing for the shaft with which overheating of the magnetic bearing and thus destruction of the metal paneling is prevented.

This object is achieved for the steam turbine given above by air ducts running in the area of the magnetic bearing in a longitudinal direction of the shaft being embodied for a supply of cooling air, with the air ducts being connected on the side of the magnetic bearing facing the blading to a cooling air supply device featuring a cooling air supply running radially and ending at the free end of the shaft end in the bearing housing.

The explicit cooling of the magnetic bearing, specifically of a magnetic bearing arranged at the hot end of a steam turbine, prevents overheating of the insulating layers of the metal paneling and thereby destruction of the magnetic bearing.

Further expedient embodiments of the inventive steam turbine emerge from the dependent claims and from the subsequent description of various exemplary embodiments of a steam turbine as claimed in the present invention which refer to the enclosed drawing.

BRIEF DESCRIPTION OF THE DRAWINGS

The figures show.

DETAILED DESCRIPTION OF INVENTION

Figure 1:
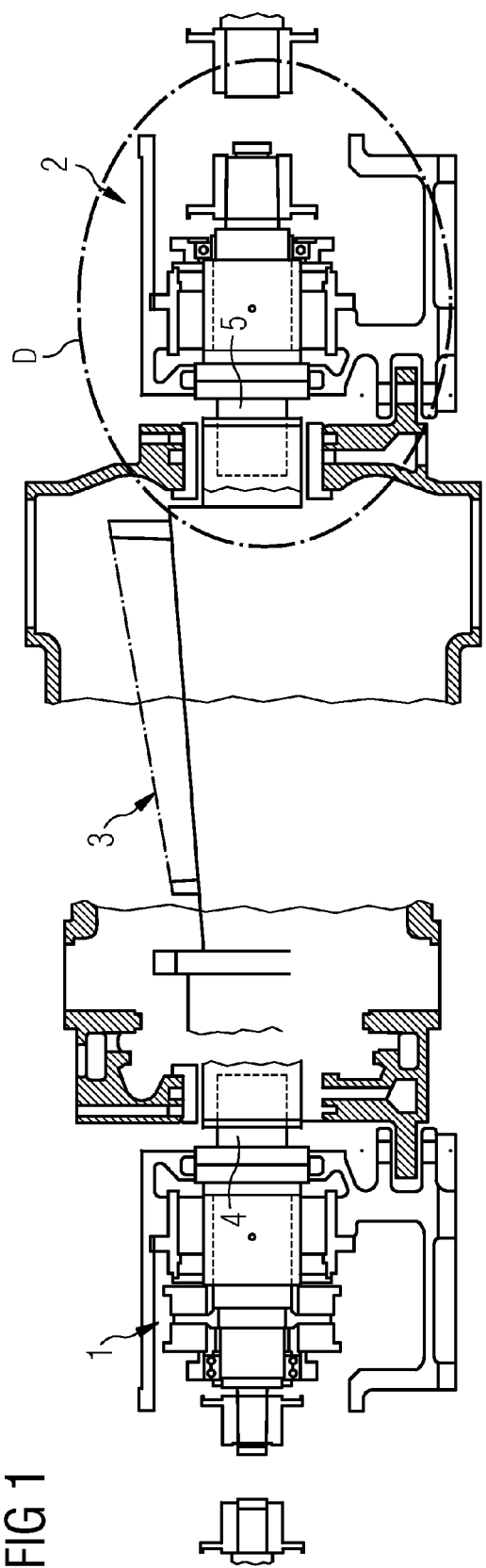
FIG. 1 part of a longitudinal section through a steam turbine according to the present invention,
FIG. 2 the detailed view D from FIG. 1,
FIG. 3 part of a longitudinal section through a magnetic bearing at a shaft end with the inventively provided cooling air duct, and
FIG. 4 part of a sectional perspective view of a shaft end with inventively provided cooling air ducts.

FIG. 1 shows the modules of an inventive steam turbine needed to understand the invention. The steam turbine essentially consists of the front bearing housing 1, the rear bearing housing 2 which is located at the hot end of the steam turbine, and the center area 3 with the blading.

The shaft of the steam turbine is supported in the front bearing housing 1 by a front screwed-on shaft end 4 and in the rear bearing housing 2 by a rear screwed-on shaft end 5.

Figure 2:
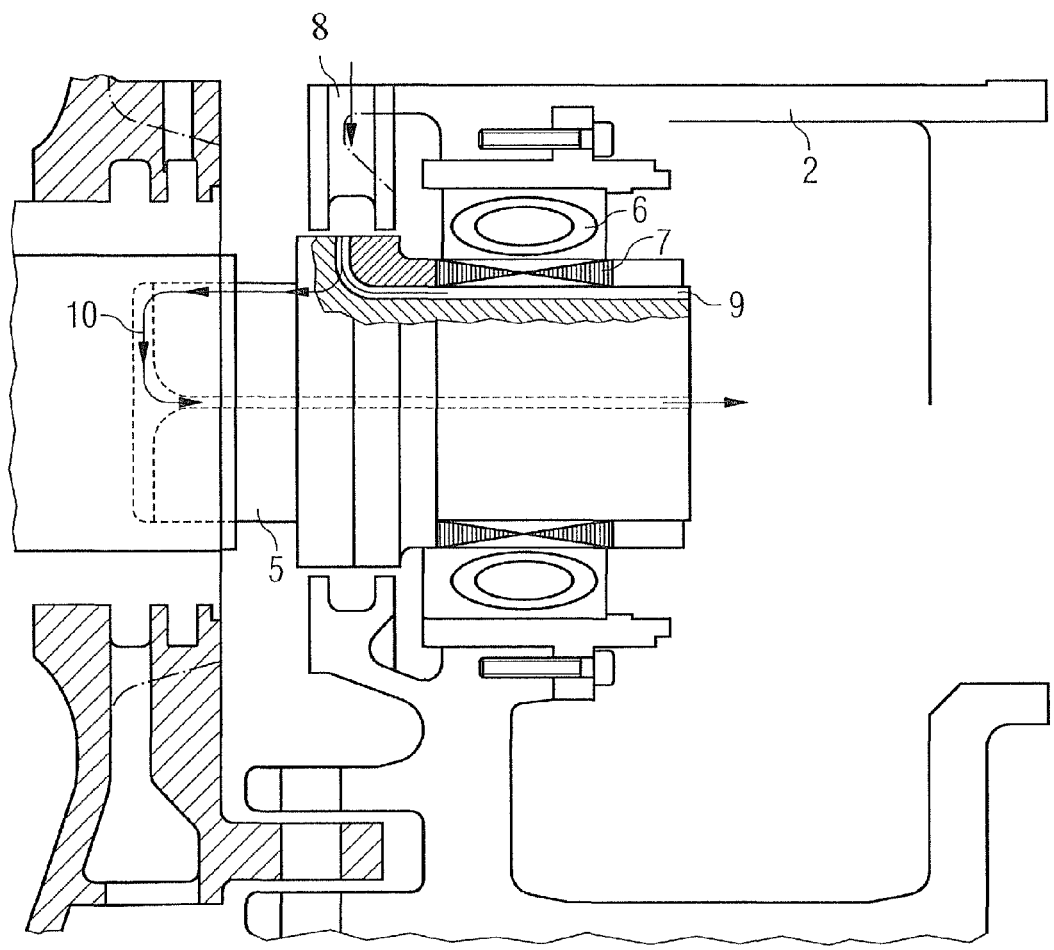

FIG. 2 shows the section D through FIG. 1, i.e. FIG. 2 shows the rear bearing housing 2 in detail. The magnetic bearing 6 with the metal paneling 7 is located in the rear bearing housing 2. Arranged below the lamination are cooling air ducts 9. The cooling air is supplied via a cooling air supply duct 8 to these cooling air ducts 9 which are arranged in a helical structure underneath the magnetic bearing 6.

The individual cooling air ducts 9 end at the free end of the rear screwed-on shaft end 5 in the rear bearing housing 2. Further cooling air ducts 10 are provided in the rear screwed-on shaft end 5.

Figure 3:
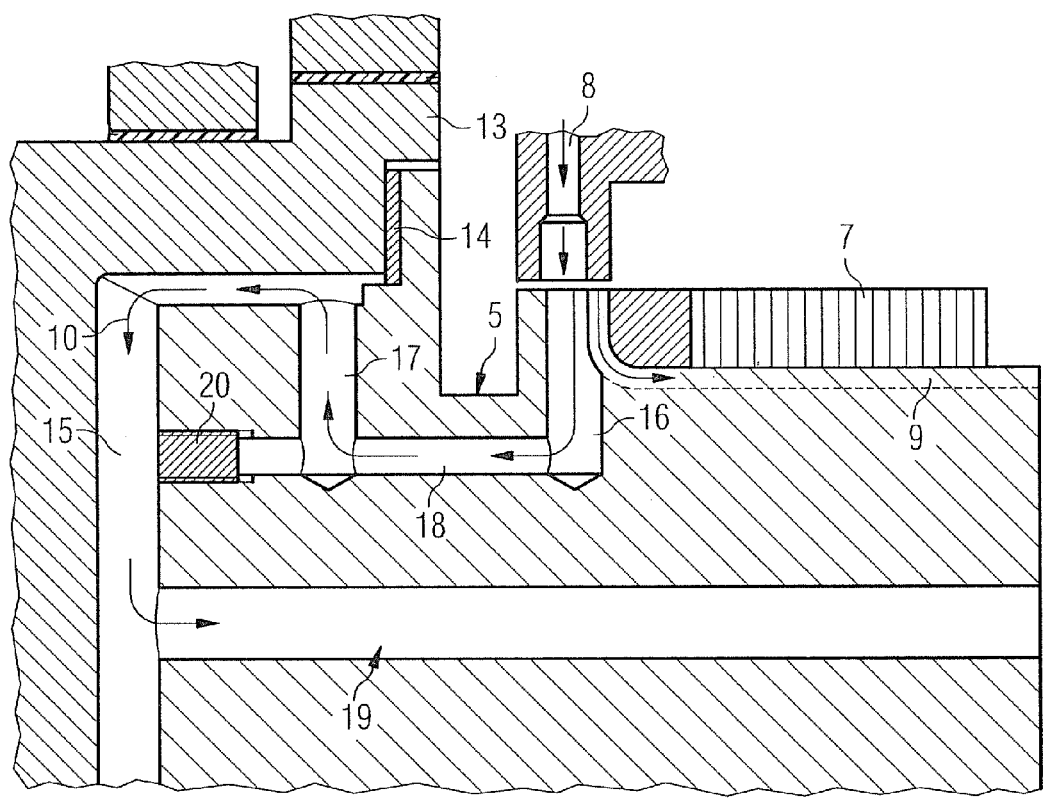

FIG. 3 shows part of a longitudinal section through the rear bearing housing 2 with the rear screwed-on shaft end 5. This figure shows two cooling air guides. One is the cooling air guide through the cooling air ducts 9 which are arranged under the metal paneling 7 and end at the free end of the rear screwed-on shaft end 5.

At the same time, in accordance with a development of the present invention, there is a further cooling air guide which is routed to the central shaft 13 and is routed back from there through a central axial hole into the rear bearing housing 2. This cooling air guide is to be described in greater detail below. The precise attachment of the shaft end 5 to the central shaft 13 is not to be described in any greater detail here. The figure merely shows an insulation bearing housing disk 14 between the central shaft 13 and the screwed on shaft end 5. This insulating disk 14 serves to interrupt the heat flow from the central shaft 13 to the rear screwed-on shaft end 5.

The cooling air supply 8 supplies both the cooling air ducts 9 and also the cooling air supply in the direction of the central shaft 13. To this end, radial blind holes 16 are provided at predetermined intervals in the area of the cooling air supply 8 embodied in the shape of a ring. Starting from the end of the rear screwed-on shaft end 5 lying opposite the central shaft 13, a number of axial holes 18 are provided in the periphery of the shaft end 5, which meet the radial blind hole 16. In the vicinity of the end of the screwed-on shaft end adjacent to the central shaft 13 further radial blind holes 17 are provided, which meet the peripheral axial holes 18.

The axial holes 18 are each closed off at their start with a closure piece 20. Furthermore, a central axial hole 19 exists which leads through the entire screwed-on shaft end 5. In this way, a further cooling air supply is produced which lead, starting from the cooling air supply 8, through the radial blind holes 16, the peripheral axial holes 18, the radial blind holes 17, through a free space between a part of the peripheral surface of the screwed-on shaft end 5 and a part of the inner peripheral surface of the central shaft 13, a chamber 15 between the central shaft 13 and screwed-on shaft end 5 and through the central axial hole 19. The axial and radial holes 17, 18 and the chamber 15 form the cooling air ducts 10.

This significantly reduces the heat transfer from the central shaft 13 to the rear screwed-on shaft end 5.

The cooling air ducts 10 for the rear screwed-on shaft end 5 described above are also possible for the front screwed-on shaft end 4.

Also with the two shaft ends 4 and 5, when the circumstances allow, the second cooling air guide can be dispensed with.

Figure 4:
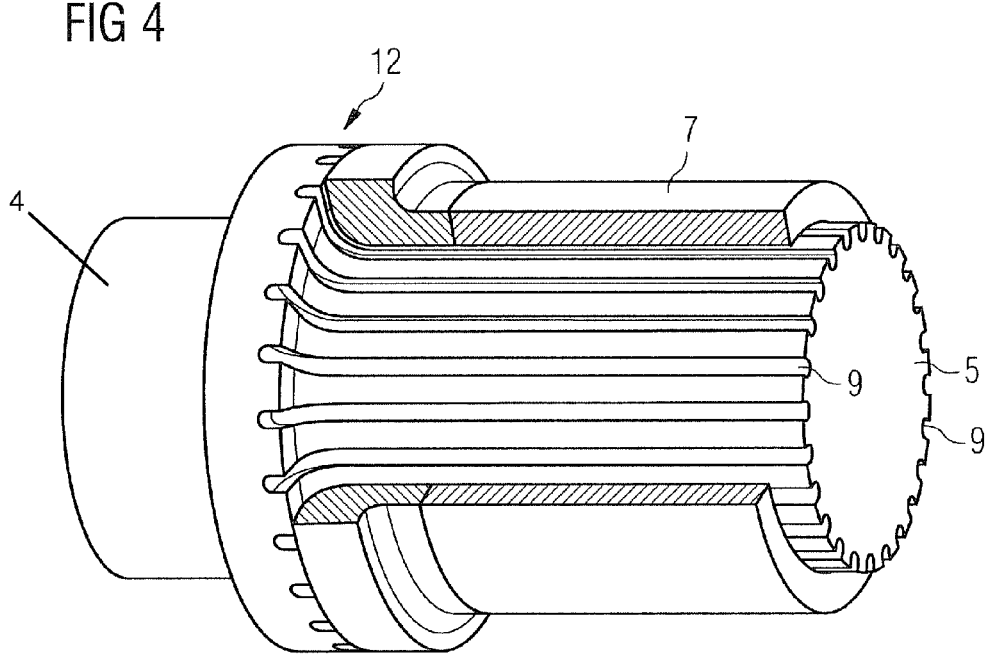

FIG. 4 shows part of a perspective cross sectional view of the shaft end 5 with cooling air ducts 9 provided in accordance with the invention. The cooling air ducts 9 are led radially outwards by means of a ring 12 consisting of two parts in order to have cooling air applied to them by of the cooling air supply 8. The cooling air ducts 9 are formed by corresponding grooves in the shaft end 5 as well as by the metal paneling 7 of the magnetic bearing.

Figure 5:
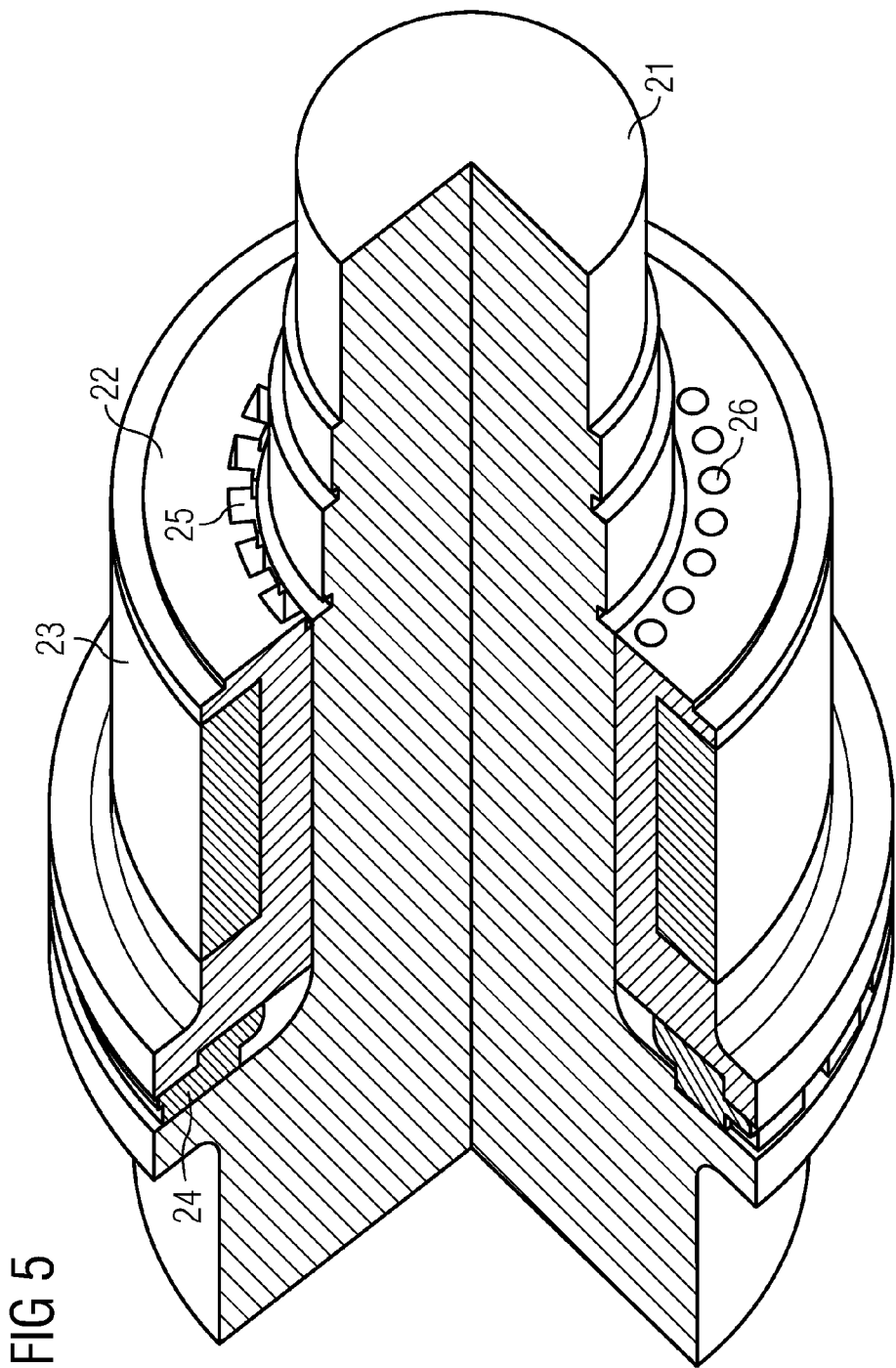
FIG. 5 part of a sectional perspective view of a shaft end with further inventively provided cooling air ducts.

FIG. 5 shows part of a cross-sectional perspective view of a shaft end 21 according to another embodiment with further cooling air ducts 25 and 26 provided in accordance with the invention. These air ducts are formed either by grooves 25 on the inner side of the collar 22 carrying the metal paneling 23 or by axial holes 26 in the collar 22. The cooling air ducts are led radially outwards by means of a ring 24.

The invention claimed is:

1. A steam turbine, comprising:
a magnetic bearing for a shaft of the steam turbine;
a metal paneling being attached in an area of the magnetic bearing;
cooling air ducts running in a longitudinal direction of the shaft in the area of the magnetic bearing for cooling air to be supplied; and
a cooling air supply device,
wherein the cooling air ducts are connected to the cooling air supply device on a side of the magnetic bearing facing towards a blading of the steam turbine, and
wherein the cooling air supply device includes a cooling air supply running radially and ending at a free end of the shaft of the steam turbine in a bearing housing of the magnetic bearing.

2. The steam turbine as claimed in claim 1, wherein the shaft includes grooves running axially in the area in which the metal paneling is attached, the grooves forming the cooling air ducts along with the metal paneling of the shaft.

3. The steam turbine as claimed in claim 1, further comprising:
collars, the collars being attached to the shaft in the area of the magnetic bearing and carrying the metal paneling, wherein inner sides of the collars include grooves which form the cooling air ducts together with the shaft surface.

4. The steam turbine as claimed in claim 1, further comprising:
collars, the collars being attached to the shaft in the area of the magnetic bearing and carrying the metal paneling, wherein holes in the collars form the cooling air ducts.

5. The steam turbine as claimed in claim 1,
wherein the shaft of the steam turbine comprises a central shaft carrying the blading and two screwed-on shaft ends,
wherein further cooling air ducts branch off from the cooling air supply duct,
wherein the further cooling air ducts lead via radial and axial holes in a shaft end of the central shaft to a screwed-on shaft end adjoining the central shaft,
wherein a chamber is provided between the shaft end of the central shaft and the screwed-on shaft end, and
wherein the further cooling air ducts lead from the chamber via a central axial hole to a free end of the screwed-on shaft end.

6. The steam turbine as claimed in claim 2,
wherein the shaft of the steam turbine comprises a central shaft carrying the blading and two screwed-on shaft ends,
wherein further cooling air ducts branch off from the cooling air supply duct,
wherein the further cooling air ducts lead via radial and axial holes in a shaft end of the central shaft to a screwed-on shaft end adjoining the central shaft,
wherein a chamber is provided between the shaft end of the central shaft and the screwed-on shaft end, and
wherein the further cooling air ducts lead from the chamber via a central axial hole to a free end of the screwed-on shaft end.

7. The steam turbine as claimed in claim 3,
wherein the shaft of the steam turbine comprises a central shaft carrying the blading and two screwed-on shaft ends,
wherein further cooling air ducts branch off from the cooling air supply duct,
wherein the further cooling air ducts lead via radial and axial holes in a shaft end of the central shaft to a screwed-on shaft end adjoining the central shaft,
wherein a chamber is provided between the shaft end of the central shaft and the screwed-on shaft end, and
wherein the further cooling air ducts lead from the chamber via a central axial hole to a free end of the screwed-on shaft end.

8. The steam turbine as claimed in claim 4,
wherein the shaft of the steam turbine comprises a central shaft carrying the blading and two screwed-on shaft ends,
wherein further cooling air ducts branch off from the cooling air supply duct,
wherein the further cooling air ducts lead via radial and axial holes in a shaft end of the central shaft to a screwed-on shaft end adjoining the central shaft,
wherein a chamber is provided between the shaft end of the central shaft and the screwed-on shaft end, and
wherein the further cooling air ducts lead from the chamber via a central axial hole to a free end of the screwed-on shaft end.

* * * * *